United States Patent [19]
Adolph et al.

[11] Patent Number: 4,988,397
[45] Date of Patent: Jan. 29, 1991

[54] ENERGETIC BINDERS FOR PLASTIC BONDED EXPLOSIVES

[75] Inventors: Horst G. Adolph; Judah Goldwasser; G. William Lawrence, all of Silver Spring, Md.

[73] Assignee: The United States of America as represented by the Secretary of the Navy, Washington, D.C.

[21] Appl. No.: 892,622

[22] Filed: Apr. 30, 1986

[51] Int. Cl.$^5$ ............................................. C06B 45/10
[52] U.S. Cl. ................................. 149/19.3; 149/19.4; 149/19.6; 149/88; 149/92
[58] Field of Search ................... 149/19.3, 19.4, 19.6, 149/20, 88, 92

[56] References Cited

U.S. PATENT DOCUMENTS 3,873,626  3/1975  Adolph ............................ 149/88 X
4,141,768  2/1979  Lo et al. ......................... 149/19.6 X
4,555,277  11/1985  Scribner ............................ 149/19.4

OTHER PUBLICATIONS

Chem. Abst., 72: 99391, by Johncock.
Johncock, Chem. Abst., vol. 78, #30524.

*Primary Examiner*—Peter A. Nelson
*Attorney, Agent, or Firm*—Kenneth E. Walden; Roger D. Johnson

[57] ABSTRACT

An energetic uncured binder composite mixture comprising
(1) a hydroxy-terminated polyfluoroformal prepolymer of the general formula

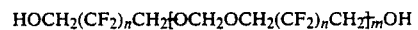

wherein n is 3 or 4 and m is selected to provide a number average molecular weight of from about 1,000 to about 10,000 for the prepolymer; and
(2) an energetic plasticizer which is
bis(2,2-dinitropropyl)formal,
bis(2,2-trinitroethyl)formal,
bis(2-fluoro-2,2-dinitroethyl)formal,
bis(2,2-difluoro-2-nitroethyl)formal,
2,2-dinitropropyl 2-fluoro-2,2-dinitroethyl formal, or mixtures thereof;

wherein the weight ratio of energetic plasticizer to prepolymer is from about 2:1 to about 5:1. This binder composite mixture is useful for preparing energetic plastic bonded explosives having high chemical and thermal stabilities.

10 Claims, No Drawings

ENERGETIC BINDERS FOR PLASTIC BONDED EXPLOSIVES

BACKGROUND OF THE INVENTION

This invention relates to explosives and more particularly to energetic binder systems for plastic bonded explosives.

Conventional cast-curable energetic binders consist typically of an energetic plasticizer like bis(2-fluoro-2,2-dinitroethyl)formal (FEFO) or a mixture of bis(2,2-dinitropropyl)acetal and bis(2,2-dinitropropyl)formal (BDNPA/F) and an inert or energetic difunctional prepolymer. The latter combination is more energetic but also more complex and costly, and generally less stable (thermally and chemically) than the former. Typical examples of the two are (1) BDNPA/F with a poly(ethylene glycol) (PEG) polymer and (2) FEFO with a polynitroalkylorthocarbonate polymer. Fluorinated polymers have also been proposed as castcurable binders for explosives and propellants but those previously investigated have limited compatibility and miscibility with energetic plasticizers.

SUMMARY OF THE INVENTION

Accordingly, an object of this invention is to provide a new explosive binder system.

Another object of this invention is to provide new plastic bonded explosives.

A further object of this invention is to provide new castcurable energetic binders for high solids content explosives.

Another object of this invention is to provide new energetic binders with improved chemical and thermal stabilities.

Still another object of this invention is to provide energetic binders with improved energy versus cost trade-offs.

These and other objects of this invention are achieved by providing a binder system comprising:

a mixture of (1) a hydroxy-terminated fluoropolyformal prepolymer of the general formula

wherein n is 3 or 4 and m is selected to provide a number average molecular weight of from about 1,000 to about 10,000 for the prepolymer; and (2) an energetic plasticizer which is
bis(2,2-dinitropropyl)formal,
bis(2,2,2-trinitroethyl)formal,
bis(2-fluoro-2,2-dinitroethyl)formal,
bis(2,2-difluoro-2-nitroethyl)formal,
2,2-dinitropropyl 2-fluoro-2,2-dinitroethyl formal,
or mixtures thereof;
wherein the weight ratio of energetic plasticizer to hydroxy-terminated fluoropolyformal prepolymer is from about 2:1 to about 5:1. Conventional solid explosive ingredients such as HMX, RDX, TNT,
1,3-diamino-2,4,6-trinitrobenzene,
1,3,5-triamino-2,4,6-trinitrobenzene,
2,2',4,4',6,6'-hexanitrostilbene,
may be added to the binder mixture and the binder mixture then cured with conventional polyisocyanates to produce an energetic plastic bonded explosive (PBX).

DETAILED DESCRIPTION OF THE PREFERRED EMBODIMENT

The novel feature of this invention is an energetic binder system consisting of an energetic plasticizer such as bis(2-fluoro-2,2-dinitroethyl)formal (FEFO) and a fluorinated polymer which is highly miscible with FEFO and similar energetic plasticizers and can be used to form HMX-based plastic bonded explosives of the same energy (detonation pressure) as analogous compositions containing nitropolymers as binders. The fluorinated polymers have greater chemical and thermal stability than do the polynitro polymers.

The hydroxy-terminated fluoropolyformal prepolymer may be represented by the general formula

wherein n is 3 or 4 and m is selected to provide a number average molecular weight of from about 1,000 to about 10,000, or preferably from 1700 to 4000. Examples 1 and 2 illustrate a preferred method by which these prepolymers may be prepared and purified. The prepolymers are prepared from the reaction of the following fluorodiols,

with formaldelhyde in the presence of concentrated (80 -90%) sulfuric acid. The formaldehyde may be added in the form of formaldehyde (gas), paraformaldehyde (polymer; solid), or trioxane (trimer; solid).

Molecular weight control is achieved by varying the ratio of diol to formaldehyde. The greater the deviation from stoichiometry, the lower the molecular weight will be.

The plasticizer is a compatible energetic compound which is
bis(2,2-dinitropropyl)formal,
bis(2,2,2-trinitroethyl)formal,
bis(2-fluoro-2,2-dinitroethyl)formal,
bis(2,2-difluoro-2-nitroethyl)formal,
2,2-dinitropropyl 2-fluoro-2,2-dinitroethyl formal, or mixtures thereof. Of these plasticizers, bis(2-fluoro-2,2-dinitroethyl)formal is preferred because of its combination of high energy content and thermal stability. It is believed that the superior compatibility of the hydroxy-terminated fluoropolyformal prepolymers with these plasticizers is in part due to the presence of formal moieties in the polymer back bone. The fluoropolyformal prepolymer derived from 2,2,3,3,4,4-hexafluoropentane-1,5-diol (n=3) shows the greatest miscibility with these energetic formal plasticizers and is therefore the preferred prepolymer. The combination of this prepolymer and bis(2-fluoro-2,2-dinitroethyl)formal as the plasticizer is the most preferred combination.

The weight ratio of the energetic plasticizer to the hydroxy-terminated polyfluoroformal prepolymer in the binder composite mixture is from about 2:1 to about 5:1, and preferably peferably from 3:1 to 4:1.

The binder composite mixture of hydroxy-terminated fluoropolyformal prepolymer and energetic plasticizer can be used in place of conventional explosive binder systems such as those discussed in the background of the invention. The weight ratio of uncured binder mixture to other explosive ingredients is chosen to provide desired processing, performance, and safety characteristics. Preferably the cured polymer fluoro(polyformalurethane) will comprise from 4 to 8, and more preferably from 5 to 7 weight percent of the plastic bonded explosive.

The hydroxy-terminated fluoropolyformal prepolymers can be reacted with suitable materials to produce energetic, plastic binders for explosives and propellants. For example, as illustrated by Examples 3, 4, and 5, these prepolymers may be cured with polyisocyanates to produce rubbery polymers. Organic polyisocyanates which may be used in this invention include aromatic, aliphatic and cycloaliphatic diisocyanates, as for example 2,4-toluene diisocyanate, 2,6-toluene diisocyanate, p-phenylene diisocyanate, 1,5-naphthylene diisocyanate, 4,4'biphenylene diisocyanate, p,p40 -methylene diphenyl diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis(cyclohexyl isocyanate), 1,51-tetrahydronaphthylene diisocyanate, polymethylenepolyphenylisocyanate (PAPI), isophorone diisocyanate, and N,N'N''-trisisocyanatohexybiuret. Mixtures of dissocyanates may also be used. The polyisocyanate is used in an amount sufficient to supply from about 0.8:1 to about 1.5:1 but preferably from 1:1 to 1.2:1 isocyanate functional groups for each hydroxy functional group.

The plastic bonded explosives are prepared from the uncured prepolymer/plasticizer mixture and conventional explosive ingredients using conventional process steps as illustrated by Example 5. First, the conventional explosive ingredients (solid explosive particles, fuels, additives, etc.) are mixed or loaded into the uncured prepolymer/plasticizer mixture in the formulated amounts. Next the calculated amount of polyisocyanate is added, along with any catalyst used, to the mixture. In each of these steps the mixture is thoroughly agitated, stirred), preferably under vacuum, to produce a uniform mixture. Finally, the mixture is cured (hydroxy-terminated fluoropolyformal prepolymer + polyisocyanate) to produce the product plastic bonded explosive.

Conventional solid explosive ingredients which may be used to prepare the plastic bonded explosives include, but are not limited to, HMX, RDX, TNT, 1 1,3-diamino-2,4,6-trinitrobenzene,
1 1,3,5-triamino-2,4,6-trinitrobenzene,
1 2,2',4,4',6,6'-hexanitrostilbene, etc.

Fuels such as aluminum powder may also be added.

The general nature of the invention having been set forth the following examples are presented as specific illustrations thereof. It will be understood that the invention is not limited to these specific examples but is susceptible to various modifications that will be recognized by one of ordinary skill in the art.

EXAMPLE 1

Preparation of 2,2,3,3,4,4-Hexafluoropentane-1,5-diol Polyformal 160.9 g of 2,2,3,3,4,4-hexafluoropentane-1,5-diol were dissolved in 144.8 ml of 80% sulfuric acid; the solution was cooled in an ice-bath and 130 ml of dry (sieves) dichloromethane were added, followed by a solution of 27.6 g of paraformaldehyde in 100.6 ml of 90% sulfuric acid (dropwise addition with continued cooling). The mixture was stirred vigorously overnight at room temperature (23° C.), then poured over 1200 g of ice; the flask was rinsed with a small amount of ice water which was then added to the bulk of the drown-mixture. 1200 ml of ether and 150 ml of 30% aqueous hydrogen peroxide were added, and the mixture was stirred 1 hour. The phases were separated and the ether layer was washed with 1200 ml of 5% aqueous KOH + 75 ml of 30% $H_2O_2$, then with 700 ml of 2.5% KOH, then with 700 ml of water; sodium chloride was added as necessary for separation (as little as possible). The ether layer was then stirred 1.5 hours with 400 ml of 0.05N HCl, the phases were separated, the ether was washed with 250 ml of water, dried (calcium sulfate), filtered through a medium porosity sinterglass fritte, and stripped in vacuo at room temperature. The remaining viscous oil was heated in vacuo (0.1 torr) gradually to 150° C. and held at this temperature overnight. The volatiles were collected in a cold-trap. Obtained were 67.7 g (39.8%) of polymer containing ca 5% of low molecular weight cyclic formals. This polymer was analyzed by gas phase chromatography (GPC) with the following result:

1 Mn=2,930
1 Mw=7,345
1 D[32 2.51

The polymer contained approximately 5% of low molecular weight cyclic formals.

EXAMPLE 2

Preparation of 2,2,3,3,4,4,5,5-Octafluorohexane-1,6-diol Polyformal 3.98 g of 2,2,3,3,4,4,5,5-octafluorohexane-1,6-diol were dissolved in 2.9 ml of 80% sulfuric acid. 2.6 ml of dichloromethane were added with ice-cooling, followed by dropwise addition of a solution of 0.552 g of paraformaldehyde in 2 ml of 90% sulfuric acid. The mixture was stirred for 24 hours at room temperature and worked up as described in Example 1 (using proportional amounts of reagents and solutions). Volatiles were removed from the crude polymer by heating in vacuo overnight at 110° C; yield: 3.5 g (84%) of viscous oil. GPC analysis showed no low molecular weight cyclic formals present and gave the following results:

$M_n = 6,000$
$M_w = 11,000$
$D = 1.9$

EXAMPLE 3

Preparation of Hexafluoropentanediol Polyformal/FEFO Gumstock 1.70 g of the 2,2,3,3,4,4-hexafluoropentane-1,5-diol polyformal prepolymer prepared in Example 1 and 3.42 g of bis(2-fluoro-2,2-dinitroethyl)formal (FEFO) were mixed until homogeneous and heated at 60° C under vacuum for 16 hours; weight loss was 20 mg. 2.2 mg of dibutyltindilaurate were added to a 5 ml beaker followed by 2.664 g of the polymer/FEFO mixture. This 7 was mixed until homogeneous and 67.6 mg of PAPI-135 polisocyanate (polymethylenepolyphenylisocyanate) were added and stirring was continued until a homogeneous solution was obtained. The mixture was heated under vacuum at 65° C for 30 minutes and was then cured at 60° C for 72 hours. A clear brown rubbery gumstock was obtained which remained homogeneous on cooling to room temperature and had a density of 1.59 g/cm[hu 3[l .

EXAMPLE 4

Preparation of Octafluorohexanediol Polyformal/FEFO Gumstock 3.3 g of the 2,2,3,3,4,4,5,5-Octafluorohexane-1,6-diol polyformal prepolymer prepared in Example 2 and 3.3 g of bis(2-fluoro-2,2,-dinitroethyl)formal (FEFO) were mixed followed by heating to 50° C followed by degassing in vacuo at 50° C overnight. 4.5 mg of dibutyltindilaurate were added with thorough mixing following by 144 mg PAPI-135 polyisocyanate (polymethylenepolyphenylisocyanate). The ingredients were again mixed thoroughly and were heated at 55° C for 4 days. A rubbery gumstock was formed which remained homogeneous on cooling to room temperature (no exudation of plasticizer).

EXAMPLE 5

Preparation of Hexafluoropentanediol Polyformal/FEFO/HMX Plastic Bonded explosive a dichloromethane solution of 22.30 g of 2,2,3,3,4,4-hexafluoropentane-1,5-diol polyformal prepolymer prepared in example 1 were poured into a pint pot of a Baker-Perkins mixer. The solvent was evaporated under vacuum using a liquid nitrogen trap for 4 hours at room temperature. 66.95 g of bis(2-fluoro-2,2-dinitroethyl)forma (FEFO) 1 were added and the solution was degassed at 65[14 70° C for 2 hours. 82.29 g of HMX Class B were added to the solution which was then mixed for 15 minutes under vacuum. A first half of 246.87 g of HMX Class C and 0.61 g of dibutyltindilaurate (DBTDL) were added and the composition was mixed for 15 mixtures under vacuum. The remaining half of the HMX Class C, 0.586 g of isophorone diisocyanate (IPDI) and 2.389 g of T-1890 isocyanate were added and the resulting composition was mixed for 15 minutes under vacuum. During this last mixing cycle, the pot temperature was gradually raised to 75° C by the end of the cycle. The mixture was vacuum cast into a detonation velocity tube; end of mix viscosity was 11.6 KP. Curing was obtained during 6 days at 60° C. The density of the cured composition was 1.81 g/cm[hu 3[l

EXAMPLE 6

Comparative Testing

The detonation velocity of a plastic bonded explosive (PBX) composition containing 78% HMX, 15.86% FEFO, 5.29% hexafluoropentandiol polyformal, and 0.85% T1890/IPDI/DBTDL curative was found to be 8460 m/sec. Using the Kamlet equations for calculating detonation parameters, a detonation pressures of 319 Kbar corresponds to this velocity. For purposes of comparison, the detonation pressures of two PBXs containing nitropolymers AFNOL and GP-2 in place of the fluoro-polymers polymers were determined in the same fashion. AFNOL is a polynitropolyester based on 2,2,8,8-tetranitro-4,6-dioxanonane-1,9-diol and 4,4-dinitropimelic acid. GP-2 is a polynitropolyorthocarbonate based on 2,2,8,8-tetranitro-4,6-dioxanonane-1,9-diol and bis(2,2-dinitropropyl)dichloroformal. After adjustment to the same volume percent HMX, the detonation pressures of the 3 compositions were: fluoropolymer composition, 322 Kbar; AFNOL composition, 325 Kbar; GP-2 composition, 325 Kbar.

A comparison of the test results in Example 6 shows that in combination with an energetic plasticizer the fluoropolymer can replace nitropolymers in an energetic binder without resultant losses in energy (detonation pressure) of the PBX. This represents significant advantages because fluoropolymers are inherently more stable than nitropolymers, and several of the fluoropolyformals described above are potentially much less expensive than nitropolymers such as GP-2 and AFNOL.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United states is:

1. A binder composite comprising a mixture of
    (1) a hydroxy-terminated fluoropolyformal prepolymer of the general formula

$$HOCH_2(CF_2)_nCH_2\text{+}OCH_2OCH_2(CF_2)_nCH_2\text{+}_mOH$$

wherein n is 3 or 4 and m is selected to provide a number average molecular weight of from about 1,000 to about 10,000 for the prepolymer; and
    (2) an energetic plasticizer selected from the group consisting of
        bis(2,2-dinitropropyl)formal,
        bis(2,2,2-trinitroethyl)formal,
        bis(2-fluoro-2,2-dinitroethyl)formal,
        bis(2,2-difluoro-2-nitroethyl)formal,
        2,2-dinitropropyl 2-fluoro-2,2-dinitroethyl formal,
    or mixtures thereof;
wherein the weight ratio of the energetic plasticizer to the hydroxy-terminated fluoropolyformal prepolymer is from about 2:1 to about 5:1.

2. A binder composite according to claim 1 wherein n=3.

3. A binder composite according to claim 1 wherein n=4.

4. A composite according to claim 1 wherein the weight ratio of the energetic plasticizer to the hydroxy-terminated polyfluoroformal prepolymer is from 3:1 to 4:1.

5. A binder composite according to claim 1 wherein the energetic plasticizer is bis(2-fluoro-2,2-dinitroethyl)-formal.

6. A binder composite according to claim 1 wherein the number average molecular weight of the prepolymer is from 1700 to 4000.

7. An energetic plastic bonded explosive which is produced by loading a binder composite according to claim 1 with solid explosive ingredients and then curring the hydroxy-terminated polyfluoroformal prepolymer of the binder composite with a polyisocyanate selected from the group consisting of 2,4-toluene diisocyanate, 2,6-toluene diisocyanate, p-phenylene diisocyanate, 1,5-naphthylene diisocyanate, 4,4[40 -biphenylene diisocyanate, p,p[40 -methylene diphenyl diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis(cyclohexyl isocyanate), 1,5-tetrahydronaphthylene diisocyanate, polymethylenepolyphenylisocyanate, isophorone diisocyanate, N,N', N'-trisisocyanatohexylbiuret, and mixtures thereof; wherein the ratio of isocyanate functional groups to hydroxy functional groups is from 0.8:1 to 1.5:1.

8. An energetic plastic bonded explosive according to claim 7 wherein the ratio of isocyanate functional groups to hydroxy functional groups used is from 1.0:1 to 1.2:1.

9. An energetic plastic bonded explosive according to claim 7 wherein the cured polymer produced by the reaction of the hydroxy-terminated prepolymer and the polyisocyanate comprises from 4 to 8 weight percent of the energetic plastic bonded explosive.

10. An energetic plastic bonded explosive according to claim 1 wherein the cured polymer comprises from 5 to 7 weight percent of the energetic plastic bonded explosive.

* * * * *